（12） United States Patent
Frost

(10) Patent No.: US 8,195,583 B2
(45) Date of Patent: Jun. 5, 2012

(54) CORRELATING INSTRUCTION SEQUENCES WITH CPU PERFORMANCE EVENTS TO IMPROVE SOFTWARE PERFORMANCE

(75) Inventor: Gary R. Frost, Driftwood, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 572 days.

(21) Appl. No.: 12/472,820

(22) Filed: May 27, 2009

(65) Prior Publication Data

US 2010/0306514 A1 Dec. 2, 2010

(51) Int. Cl.
*G06F 15/18* (2006.01)
(52) U.S. Cl. ......................................................... 706/12
(58) Field of Classification Search ...................... 706/12
See application file for complete search history.

(56) References Cited

U.S. PATENT DOCUMENTS

| 2008/0244537 A1 | 10/2008 | Wintergerst et al. |
| 2008/0244546 A1 | 10/2008 | Schmelter et al. |
| 2008/0244547 A1 | 10/2008 | Wintergerst et al. |

OTHER PUBLICATIONS

A novel method for parsing complex sentences in syntactically free languages, Michos, S.E.; Fakotakis, N.; Kokkinakis, G.; Tools with Artificial Intelligence, 1994. Proceedings., Sixth International Conference on Digital Object Identifier: 10.1109/TAI.1994.346483 Publication Year: 1994 , pp. 253-259.*
A New Framework for Textual Information Mining over Parse Trees, Mousavi, H.; Kerr, D.; Iseli, M.; Semantic Computing (ICSC), 2011 Fifth IEEE International Conference on Digital Object Identifier: 10.1109/ICSC.2011.19 Publication Year: 2011 , pp. 185-188.*
An Efficient Algorithm for Almost Instantaneous VF Code Using Multiplexed Parse Tree, Yoshida, S.; Kida, T.; Data Compression Conference (DCC), 2010 Digital Object Identifier: 10.1109/DCC.2010.27 Publication Year: 2010 , pp. 219-228.*
A Parsing Technique for Sketch Recognition Systems, Costagliola, G.; Deufemia, V.; Polese, G.; Risi, M.; Visual Languages and Human Centric Computing, 2004 IEEE Symposium on Digital Object Identifier: 10.1109/VLHCC.2004.3 Publication Year: 2004 , pp. 19-26.*

\* cited by examiner

*Primary Examiner* — Michael B Holmes
(74) *Attorney, Agent, or Firm* — Hamilton & Terrile, LLP; Gary W. Hamilton

(57) ABSTRACT

A system and method are disclosed for correlating instruction sequences. A plurality of instructions is processed to parse a first sequence of instructions comprising a first area of interest. A first instruction sequence pattern is then generated from the first sequence of instructions. Pattern matching operations are performed with the first instruction sequence pattern. A second sequence of instructions are parsed, comprising a second instruction sequence pattern and a second address of interest that is a substantially equivalent match to the first instruction sequence pattern.

20 Claims, 5 Drawing Sheets

CORRELATING INSTRUCTION SEQUENCES WITH CPU PERFORMANCE EVENTS TO IMPROVE SOFTWARE PERFORMANCE

BACKGROUND OF THE INVENTION

1. Field of the Invention

Embodiments of the invention relate generally to information processing systems. More specifically, embodiments of the invention provide a system and method for correlating sequences of instructions.

2. Description of the Related Art

When a CPU reports performance issues (e.g., cache misses, pipeline stalls, etc.) it does so against a specific address in memory. Performance engineers analyze sequences of instruction(s) proximate to the highlighted address(es) and attempt to determine optimal code choices to improve performance.

Currently, the performance analysis process is manual with the performance engineer looking at the highlighted address and surrounding code to determine the nature of the performance issue. It would be desirable, however, to automate the process of correlating "instruction sequences" from multiple locations and overlaying this data with the performance data provided by profiling tools. This automation would require a software component that searches through all instruction sequences for which there is performance data and locate substantially similar subsequences or subsequence "patterns" of code for further analysis.

SUMMARY OF THE INVENTION

Embodiments of the invention for a system for correlating instruction sequences comprises processing logic operable to process a plurality of instructions to parse a first sequence of instructions comprising a first area of interest. A first instruction sequence pattern is then generated from the first sequence of instructions. Pattern matching operations are performed with the first instruction sequence pattern to parse a second sequence of instructions comprising a second instruction sequence pattern and a second address of interest. An interface receives input data associated with the first address of interest and to provides output data associated with the second address of interest. In various embodiments, the interface is a user interface. In these and other embodiments, the input data is received from a user within the user interface and the output data is displayed within the user interface.

In the various embodiments discussed herein, the second instruction sequence pattern is a substantially equivalent match to the first instruction sequence pattern. In various embodiments of the system of the present invention, the processing logic is further operable to store the second instruction sequence pattern as a known instruction sequence pattern in a repository of known instruction sequence patterns. In some embodiments of the invention, the pattern matching operations are performed using known instruction sequence patterns from the repository of known instruction sequence patterns. In some embodiments of the invention, the first sequence of instructions comprises a first number of instructions preceding the first address of interest and a second number of instructions succeeding the first address of interest.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
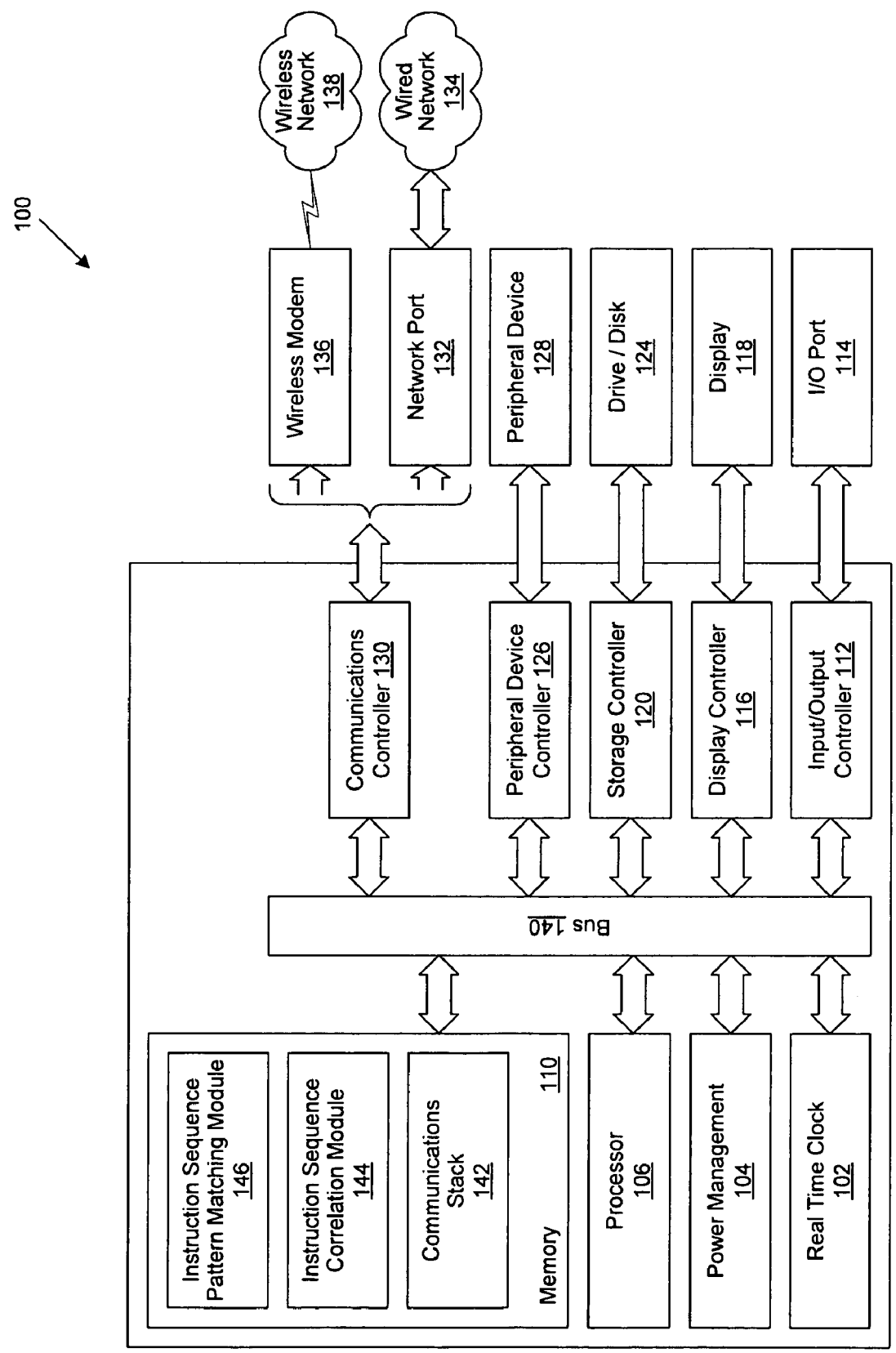
FIG. 1 is a general illustration of components of an information handling system containing.

A system and method are disclosed for correlating sequences of instructions. FIG. 1 is a generalized block diagram illustrating an information processing system 100 as implemented in accordance with an embodiment of the invention. System 100 comprises a real-time clock 102, a power management module 104, a processor 106 and memory 110, all physically coupled via bus 140. In various embodiments, memory 110 comprises volatile random access memory (RAM), non-volatile read-only memory (ROM), non-volatile flash memory, or any combination thereof. In one embodiment, memory 110 also comprises communications stack 142, an instruction sequence correlation module 144 and an instruction sequence pattern matching module 146.

Also physically coupled to bus 140 is an input/out (I/O) controller 112, further coupled to a plurality of I/O ports 114. In different embodiments, I/O port 114 may comprise a keyboard port, a mouse port, a parallel communications port, an RS-232 serial communications port, a gaming port, a universal serial bus (USB) port, an IEEE1394 (Firewire) port, or any combination thereof. Display controller 116 is likewise physically coupled to bus 140 and further coupled to display 118. In one embodiment, display 118 is separately coupled, such as a stand-alone, flat panel video monitor. In another embodiment, display 118 is directly coupled, such as a laptop computer screen, a tablet PC screen, or the screen of a personal digital assistant (PDA). Likewise physically coupled to bus 140 is storage controller 120 which is further coupled to mass storage devices such as a tape drive or hard disk 124. Peripheral device controller is also physically coupled to bus 140 and further coupled to peripheral device 128, such as a random array of independent disk (RAID) array or a storage area network (SAN).

In one embodiment, communications controller 130 is physically coupled to bus 140 and is further coupled to network port 132, which in turn couples the information processing system 100 to one or more physical networks 134, such as a local area network (LAN) based on the Ethernet standard. In other embodiments, network port 132 may comprise a digital subscriber line (DSL) modem, cable modem, or other broadband communications system operable to connect the information processing system 100 to network 134. In these embodiments, network 134 may comprise the public switched telephone network (PSTN), the public Internet, a corporate intranet, a virtual private network (VPN), or any combination of telecommunication technologies and protocols operable to establish a network connection for the exchange of information.

In another embodiment, communications controller 130 is likewise physically coupled to bus 140 and is further coupled to wireless modem 136, which in turn couples the information processing system 100 to one or more wireless networks 138. In one embodiment, wireless network 138 comprises a personal area network (PAN), based on technologies such as Bluetooth or Ultra Wideband (UWB). In another embodiment, wireless network 138 comprises a wireless local area network (WLAN), based on variations of the IEEE 802.11 specification, often referred to as WiFi. In yet another embodiment, wireless network 138 comprises a wireless wide area network (WWAN) based on an industry standard including two and a half generation (2.5G) wireless technologies such as global system for mobile communications (GPRS) and enhanced data rates for GSM evolution (EDGE). In other embodiments, wireless network 138 comprises WWANs based on existing third generation (3G) wireless technologies including universal mobile telecommunications system (UMTS) and wideband code division multiple access (W-CDMA). Other embodiments also comprise the implementation of other 3G technologies, including evolution-data optimized (EVDO), IEEE 802.16 (WiMAX), wireless broadband (WiBro), high-speed downlink packet access (HSDPA), high-speed uplink packet access (HSUPA), and emerging fourth generation (4G) wireless technologies.

As discussed above, current processes for analyzing the processing of instructions in an information processing system are manual, with the engineer looking at an address of interest and surrounding code to determine the nature of an issue. Embodiments of the invention disclosed herein provide a system and method to automate the process of correlating "instruction sequences" from multiple locations and overlaying this data with the analysis data provided by profiling tools. This automation implements a software component, or tool, that searches through all instruction sequences for which there is analysis data and locates substantially similar subsequences or subsequence "patterns" of instructions for further analysis. Thus, the tool would not look for single instructions but would look for patterns of instructions. In various embodiments of the invention, the tool "walks" through the code graphs and parses out sequences of instructions surrounding an address of interest. This can be understood by considering the following example of a code sequence with an address of interest.

| Address | Instruction | Operands | | |
|---|---|---|---|---|
| 0x0000??? | M-4 | Op-4 | X-4% | <address of interest> |
| 0x0000??? | M-3 | Op-3 | X-3% | |
| 0x0000??? | M-2 | Op-2 | X-2% | |
| 0x0000??? | M-1 | Op-1 | X-1% | |
| 0x0000??? | M1 | Op1 | X1% | |
| 0x0000??? | M2 | Op2 | X2% | |
| 0x0000??? | M3 | Op3 | X3% | |
| 0x0000??? | M4 | Op4 | X4% | |
| 0x0000??? | M... | Op... | X...% | |

By creating a moving window around a particular address and walking through the disassembled code, the tool collects sequences of instructions (based around M1,Op1) and respectively correlates the sequences of instructions with the performance data obtained from all of the addresses in the window. In general, approaches to such pattern matching are typically statistical or syntactic. Statistical pattern recognition is based on statistical characterizations of patterns, while syntactical pattern recognition is based on the structural interrelationships of features. Those of skill in the art will realize that a wide range of algorithms can be applied for pattern recognition, from very simple Bayesian classifiers to much more powerful neural networks, which are capable of learning by example through corrective feedback.

In various embodiments, the tool is operable to apply some "fuzziness" to the correlation. For example, it may match any 'Mov' instruction (rather than a specific register 'Mov') and it would then rank the sequences by their cumulative 'temperature' and allow the user to define the size of the window and the 'fuzziness' of the matching. In various embodiments, the 'fuzziness' of the pattern matching is provided by fuzzy logic approaches familiar to skilled practitioners of the art. In general, such fuzzy logic approaches are typically based on multi-valued logic derived from fuzzy set theory.

The tool is also operable to implement the analysis using some form of 'regular expression.' As an example, it might look for 'Mov' when preceded by 0 or more of any instructions which are preceded by a register exchange instruction. These 'rules' can be expressible in some form of templating language.

The window of code analyzed by the tool represents reachable code (following the edges) of the code graph. Thus instructions that are selected are those which may be executed as a result of a branch or a fallthrough. Also when looking "backwards" the tool includes instructions that could have fallen through or code that could have branched to a target within the window.

So the sequence:
0x A a
0x B b
0x j<C> label
0x D
0x E
Label 0x F
0x G

Figure 2:
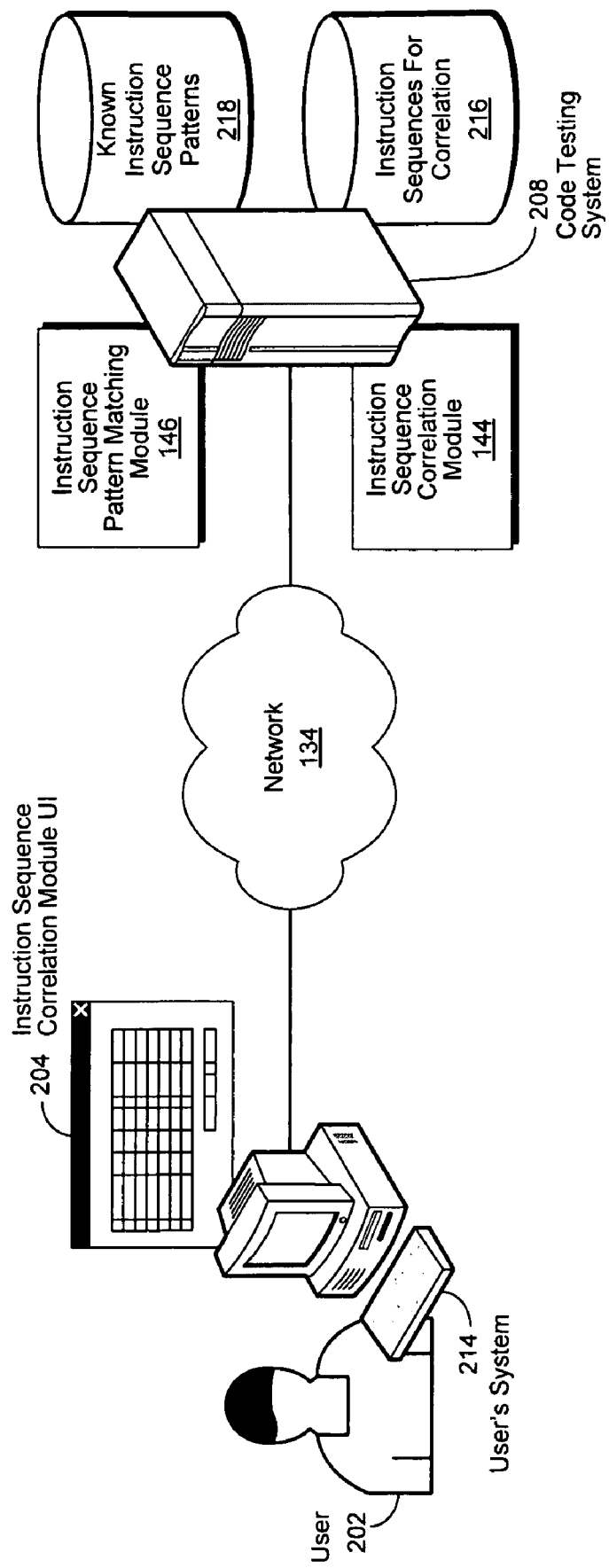
FIG. 2 is a simplified block diagram of an instruction sequence correlation module as implemented in accordance with an embodiment of the invention for correlating sequences of instructions.

Would essentially create two windows:
0x A a
0x B b
0x j<C> label
0x D
0x E
0x F
0x G
And
0x A a
0x B b
0x j<C>
0x F
0x G FIG. 2 is a simplified block diagram of an instruction sequence correlation module as implemented in accordance with an embodiment of the invention for correlating sequences of instructions. In various embodiments, a code testing system 208 comprises an instruction sequence correlation module 144 and an instruction sequence pattern matching module 144. The code testing system likewise comprises a repository of instruction sequences for correlation 216 and a repository of known sequence patterns 218.

As described in greater detail herein, a user 202 uses a system 204 to access the code testing system 208 through a connection to network 134. Once accessed, the instruction sequence correlation module 144 retrieves instruction sequences from the repository of instruction sequence 216. The instruction sequences are then displayed to the user 202 within the instruction sequence correlation module user interface (UI) 214. The user then selects an instruction sequence to correlate, followed by the selection of an address of interest. In various embodiments, the instruction sequences are provided through an interface to the code testing system 208, which automatically selects an address of interest. It will be apparent to skilled practitioners of the art that many such embodiments for the provision of the address of interest through an interface are possible and the foregoing is not intended to limit the spirit, scope, or intent of the invention. Pattern matching operations are then performed by the instruction sequence pattern matching module as described in greater detail herein. In various embodiments, known instruction sequence patterns stored in the repository of known sequence patterns 218 are retrieved and used for the pattern matching operations. In other embodiments, instruction sequence patterns are discovered during the pattern matching and instruction sequence correlation operations described in greater detail herein. Once discovered, they are stored as known instruction sequence patterns in the repository of known sequence patterns 218.

Figure 3A:
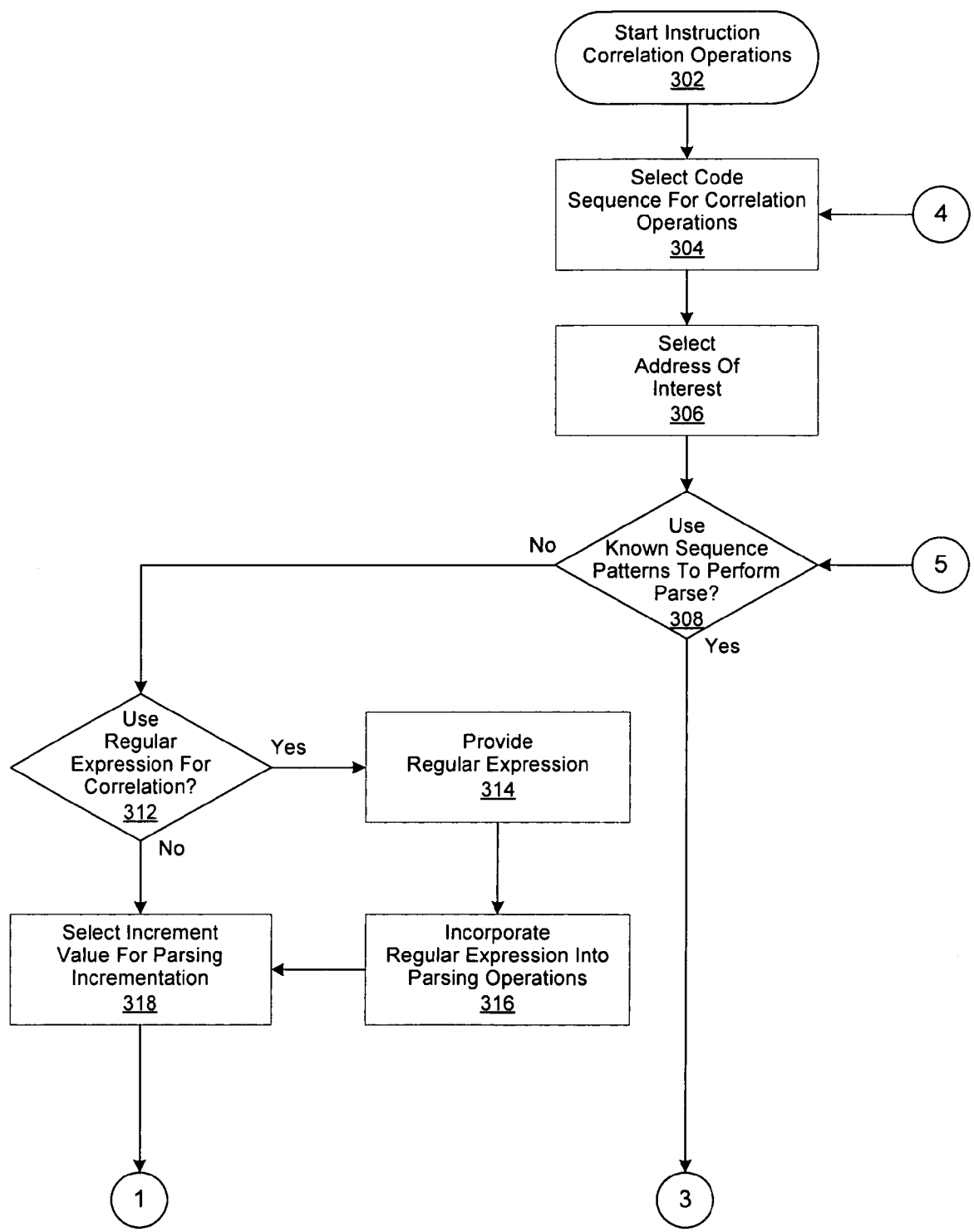
FIGS. 3a-c are a generalized flow chart of the operation of an instruction sequence correlation module as implemented in accordance with an embodiment of the invention for correlating sequences of instructions.
Figure 3B:
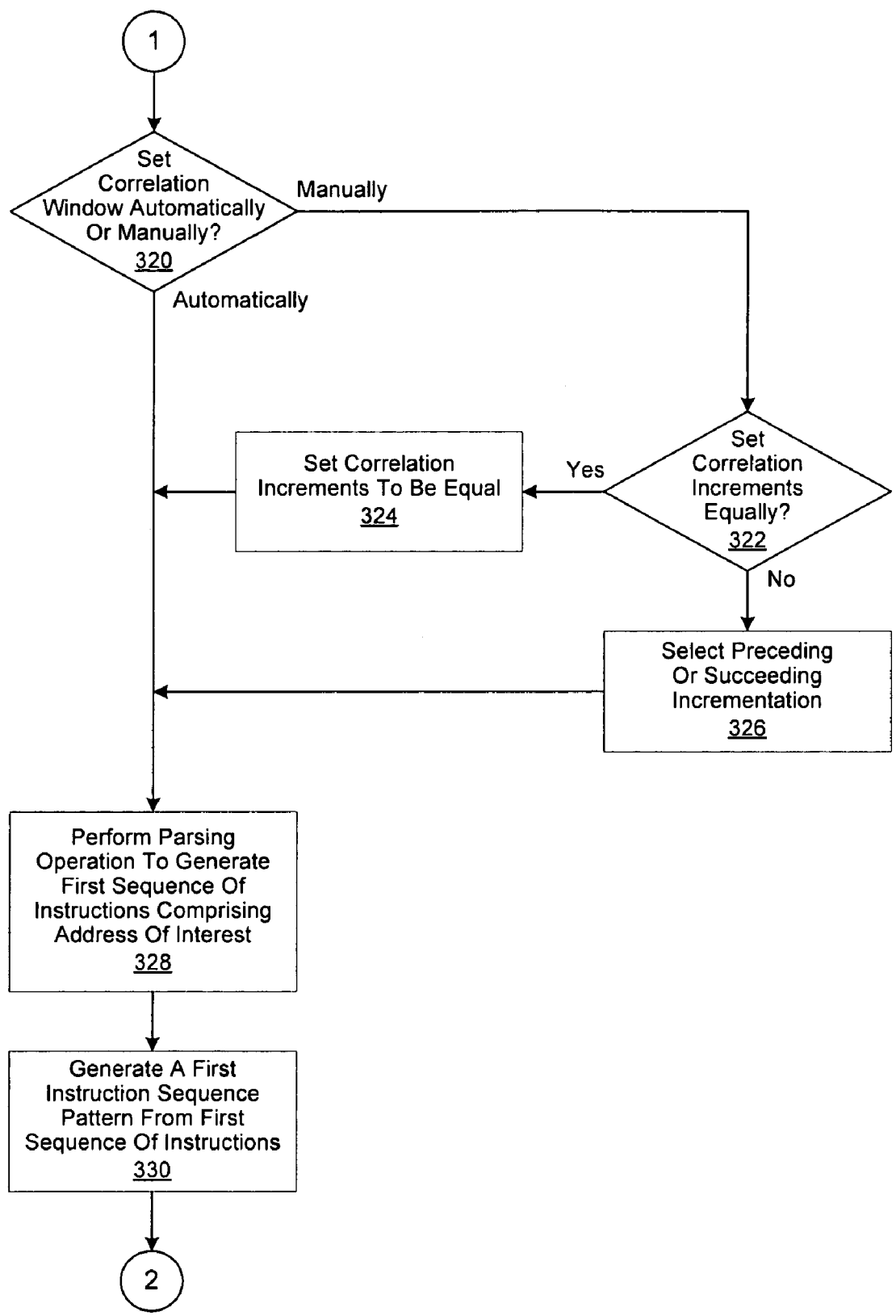
Figure 3C:
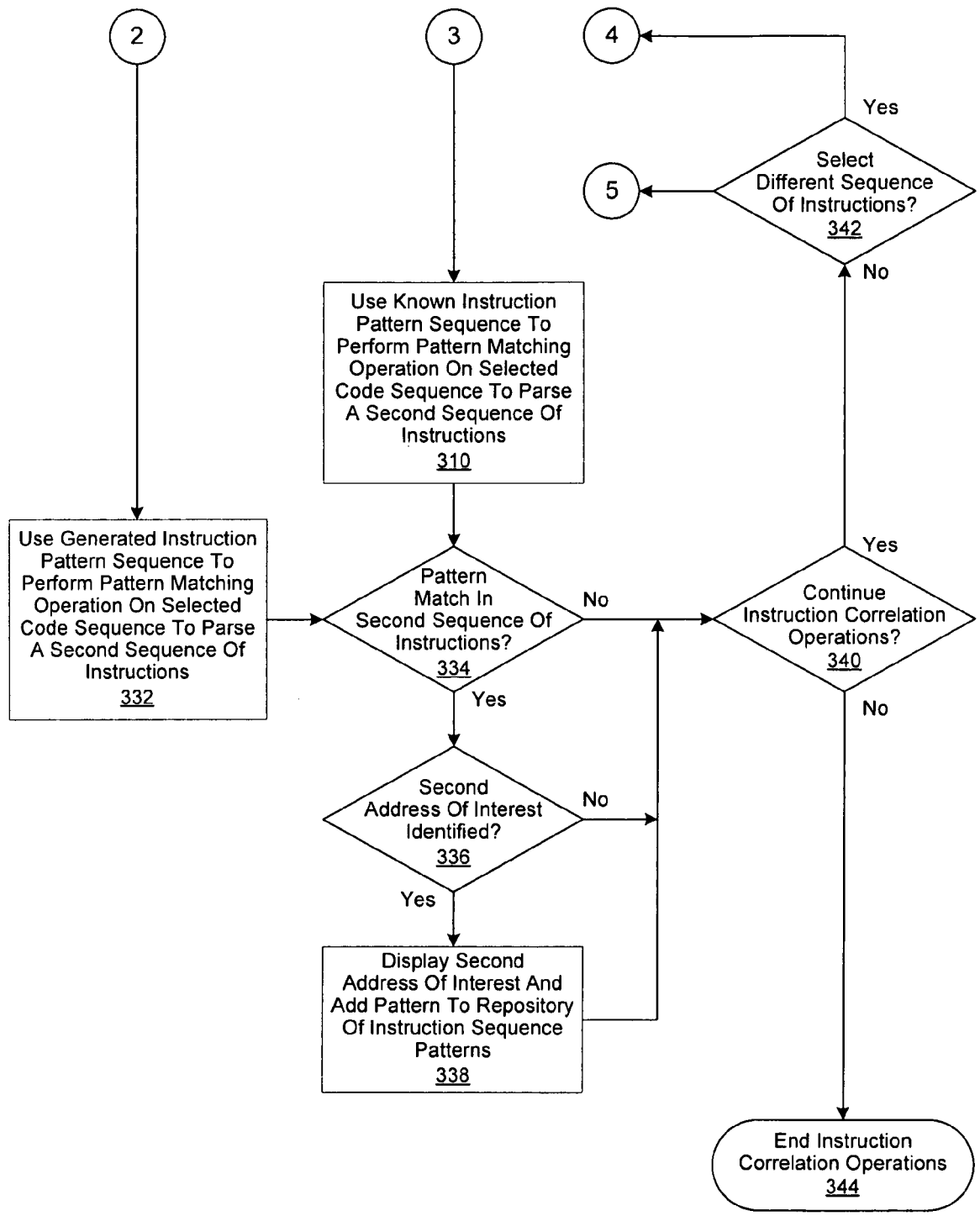

FIGS. 3*a-c* are a generalized flowchart of the operation of an instruction sequence correlation module as implemented in accordance with an embodiment of the invention for correlating sequences of instructions. Referring to FIG. 3A, correlation operations are initiated in step 302 and, in step 304, a code sequence is selected for correlation operations. In step 306 an address of interest is selected, and, in step 308, a decision is made regarding whether to use a known sequence pattern to perform a parse operation. If the result of the decision in step 308 is not to use a known sequence pattern to perform the parse operation, processing proceeds to step 312 where a decision is made regarding whether to use a "regular expression" for correlation. If the result of the decision in step 312 is to use a regular expression for correlation, processing proceeds to step 314 wherein a regular expression is provided and then to step 316 wherein the regular expression is incorporated into the parsing operation. Processing then proceeds to step 318 wherein an increment value for parsing incrementation is selected. As can be seen from FIG. 3A, if the decision in step 312 is not to use a regular expression for correlation, steps 314 and 316 are skipped and processing proceeds to step 318. Processing then proceeds to step 320 wherein a decision is made regarding whether to set the correlation window automatically or manually. If the result of the decision in step 320 is to manually set the correlation window, processing proceeds to step 322 wherein a decision is made regarding whether to set correlation increments equally. If the result of the decision in step 322 is to set the correlation increments equally, processing proceeds to step 324 wherein the correlation increments are set to be equal. If, the decision in step 322 is not to set correlation increments equally, processing proceeds to step 326 wherein the incrementation is set for preceding or succeeding incrementation. Processing then proceeds to step 328 wherein a parsing operation is performed to generate a first sequence of instructions comprising the address of interest. Processing then proceeds to step 330 wherein a first instruction sequence pattern is generated from a first sequence of instructions. Next, processing proceeds to step 322 wherein the generated instruction pattern sequence is used to perform a pattern matching operation on selected code sequences to parse a second sequence of instructions. In step 334, a test is conducted to determine whether a pattern matches obtained in the second sequence of instructions. If the result of the test conducted in step 334 indicates that a pattern match is detected in the second sequence of instructions, processing proceeds to step 336 where a test is conducted to determine whether a second area of interest has been identified. If the result of the test conducted in step 336 indicates that a second address of interest has been identified, processing proceeds to step 338 wherein the second area of interest is displayed and the pattern comprising said second address of interest is added to a repository of instruction sequence patterns. Otherwise, or if the result of the test in step 334 indicates that a pattern match was not detected in the second sequence of operations, then processing proceeds to step 340 wherein a decision is made regarding whether to continue instruction correlation operations. If the decision in step 340 is not to continue, processing proceeds to step 344 and instruction correlation operations are ended. If, however, the result of the test in step 340 is to continue instruction correlation operations, processing proceeds to step 342, wherein a different sequence of instructions are selected for testing. If the result of the test conducted in step 342 is to select a different sequence of instructions for testing, processing proceeds to step 304 as discussed hereinabove, and the aforementioned processing steps are repeated. If, however, the decision in step 308 is to use known sequence patterns for performing parsing, processing proceeds to step 310 wherein a known instruction pattern sequence is used to perform pattern matching operations on selected code sequences to parse a second sequence of instructions. Processing then proceeds to step 334 and subsequent processing is performed in accordance with steps 334, 336, 338, 340, 342 and 344 as discussed hereinabove.

Skilled practitioners in the art will recognize that many other embodiments and variations of the present invention are possible. In addition, each of the referenced components in this embodiment of the invention may be comprised of a plurality of components, each interacting with the other in a distributed environment. Furthermore, other embodiments of the invention may expand on the referenced embodiment to extend the scale and reach of the system's implementation.

What is claimed is:

1. A system for correlating instruction sequences, comprising:
    processing logic operable to process a plurality of instructions to:
        parse a first sequence of instructions comprising a first address of interest;
        generate a first instruction sequence pattern from said first sequence of instructions; and
        perform pattern matching operations with said first instruction sequence pattern to parse a second sequence of instructions comprising a second instruction sequence pattern and a second address of interest;
    an interface operable to:
        receive input data associated with said first address of interest; and
        provide output data associated with said second address of interest;
        wherein said second instruction sequence pattern is an equivalent of said first instruction sequence pattern.

2. The system of claim 1, wherein said processing logic is further operable to:
    store said second instruction sequence pattern as a known instruction sequence pattern in a repository of known instruction sequence patterns; and
    perform said pattern matching operations with said known instruction sequence pattern.

3. The system of claim 1, wherein said first sequence of instructions comprises:
    a first number of instructions preceding said first address of interest; and
    a second number of instructions succeeding said first address of interest.

4. The system of claim 3, wherein said first number of instructions and said second number of instructions are provided by a user as input data within said user interface.

5. The system of claim 3, wherein said first number of instructions and said second number of instructions are successively incremented until the said parsing of said second sequence of instructions is performed by said pattern matching operations.

6. The system of claim 5, wherein said first number of instructions are successively incremented and said second number of instructions are not.

7. The system of claim 5, wherein said second number of instructions are successively incremented and said first number of instructions are not.

8. The system of claim 1, wherein said first sequence of instructions comprises a regular expression.

9. The system of claim 8, wherein said regular expression comprises said first address of interest.

10. The system of claim 8, wherein said regular expression is provided by a user as input data within said user interface.

11. A method for correlating instruction sequences, comprising:
using processing logic to process a plurality of instructions to:
parse a first sequence of instructions comprising a first address of interest;
generate a first instruction sequence pattern from said first sequence of instructions; and
perform pattern matching operations with said first instruction sequence pattern to parse a second sequence of instructions comprising a second instruction sequence pattern and a second address of interest;
using an interface to:
receive input data associated with said first address of interest; and
provide output data associated with said second address of interest;
wherein said second instruction sequence pattern is an equivalent of said first instruction sequence pattern.

12. The method of claim 11, wherein said processing logic is further operable to:
store said second instruction sequence pattern as a known instruction sequence pattern in a repository of known instruction sequence patterns; and
perform said pattern matching operations with said known instruction sequence pattern.

13. The method of claim 11, wherein said first sequence of instructions comprises:
a first number of instructions preceding said first address of interest; and
a second number of instructions succeeding said first address of interest.

14. The method of claim 13, wherein said first number of instructions and said second number of instructions are provided by a user as input data within said user interface.

15. The method of claim 13, wherein said first number of instructions and said second number of instructions are successively incremented until the said parsing of said second sequence of instructions is performed by said pattern matching operations.

16. The method of claim 15, wherein said first number of instructions are successively incremented and said second number of instructions are not.

17. The method of claim 15, wherein said second number of instructions are successively incremented and said first number of instructions are not.

18. The method of claim 11, wherein said first sequence of instructions comprises a regular expression.

19. The method of claim 18, wherein said regular expression comprises said first address of interest.

20. The method of claim 18, wherein said regular expression is provided by a user as input data within said user interface.

* * * * *